United States Patent
Steiner

(10) Patent No.: US 6,836,360 B2
(45) Date of Patent: Dec. 28, 2004

(54) BINOCULARS, TELESCOPE, OR THE LIKE

(75) Inventor: Carl Steiner, Bindlach (DE)

(73) Assignee: Steiner-Optik GmbH, Bayreuth (DE)

( * ) Notice: Subject to any disclaimer, the term of this patent is extended or adjusted under 35 U.S.C. 154(b) by 56 days.

(21) Appl. No.: 10/293,361

(22) Filed: Nov. 14, 2002

(65) Prior Publication Data

US 2003/0090793 A1 May 15, 2003

(30) Foreign Application Priority Data

Nov. 14, 2001 (DE) .................................... 201 18 427 U

(51) Int. Cl.⁷ .............................................. G02B 23/00
(52) U.S. Cl. ......................... 359/407; 359/399; 24/302
(58) Field of Search ......................... 359/399, 407–418, 359/480–482, 815, 879, 880; 224/271; 24/302

(56) References Cited

U.S. PATENT DOCUMENTS

| | | | | |
|---|---|---|---|---|
| 3,251,110 A | * | 5/1966 | Hedu ........................... | 24/616 |
| 4,035,877 A | * | 7/1977 | Brownson et al. ............ | 24/323 |
| 4,802,262 A | * | 2/1989 | Kasai ........................... | 24/606 |
| 5,644,426 A | * | 7/1997 | Hotta ........................... | 359/409 |
| 5,740,952 A | * | 4/1998 | Huckenbeck ................. | 224/271 |

* cited by examiner

*Primary Examiner*—Mark A. Robinson
(74) *Attorney, Agent, or Firm*—Browdy and Neimark, P.L.L.C.

(57) ABSTRACT

Binoculars, a telescope, or the like, having a removable strap, wherein
a coupling is disposed on the casing of the binoculars, and a coupling pin, which cooperates with the coupling, is disposed at the end of the strap,
wherein the coupling pin incorporates an inherently elastic locking tab that projects hook-like from the plane of the coupling pin surface,
wherein the coupling has a longitudinal recess to receive the locking tab under elastic deformation of the same,
wherein, when the locking tab is inserted into the longitudinal recess, the locking tab locks behind a coupling projection, and
wherein the longitudinal recess is open toward the outside and a swivel-mounted release key is disposed there in such a way that, by pushing the release key from outside in, the locking tab is pushed inward and moved out of engagement with the coupling projection.

4 Claims, 4 Drawing Sheets

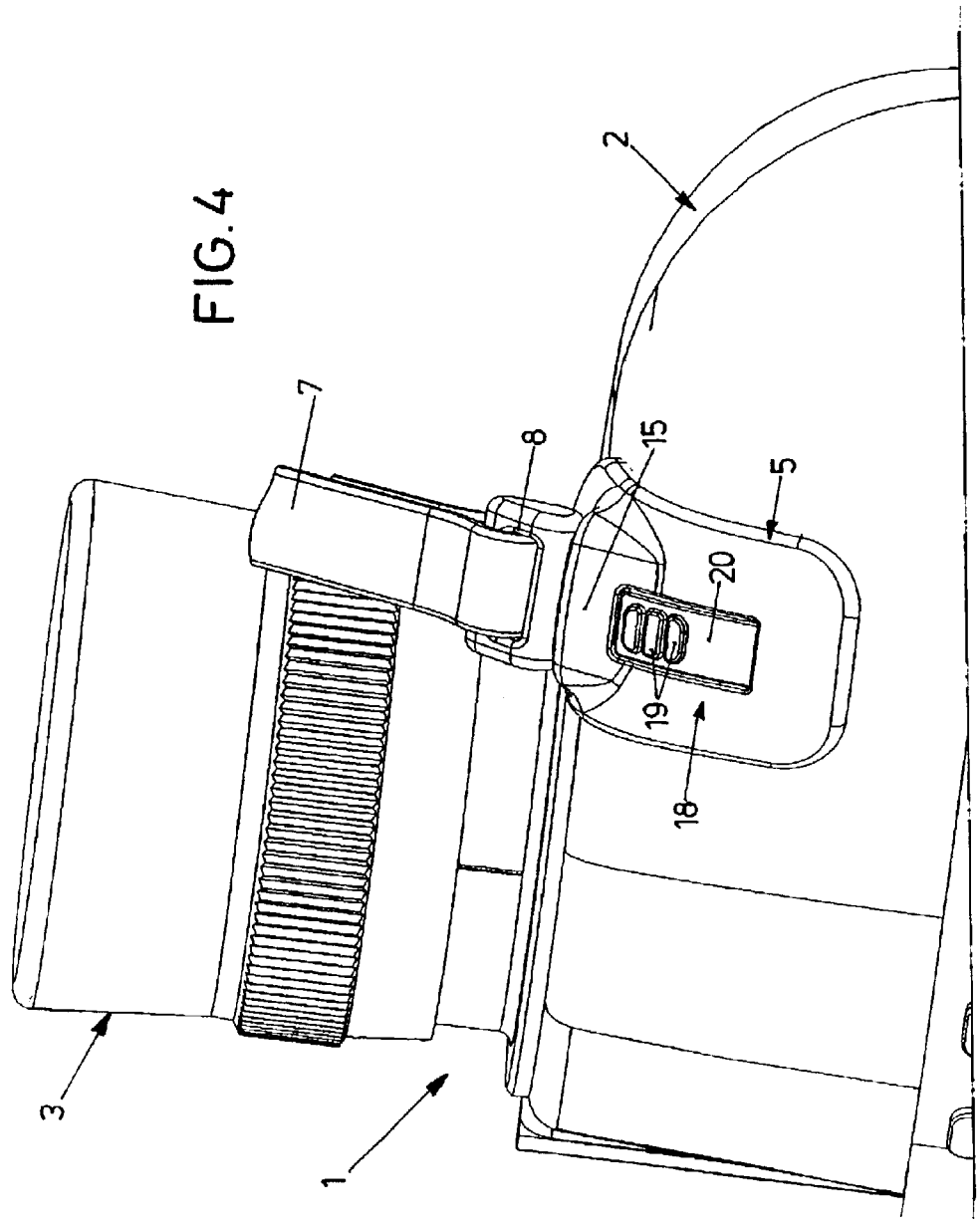

BINOCULARS, TELESCOPE, OR THE LIKE

BACKGROUND OF THE INVENTION

1. Field of the Invention

Figure 1:
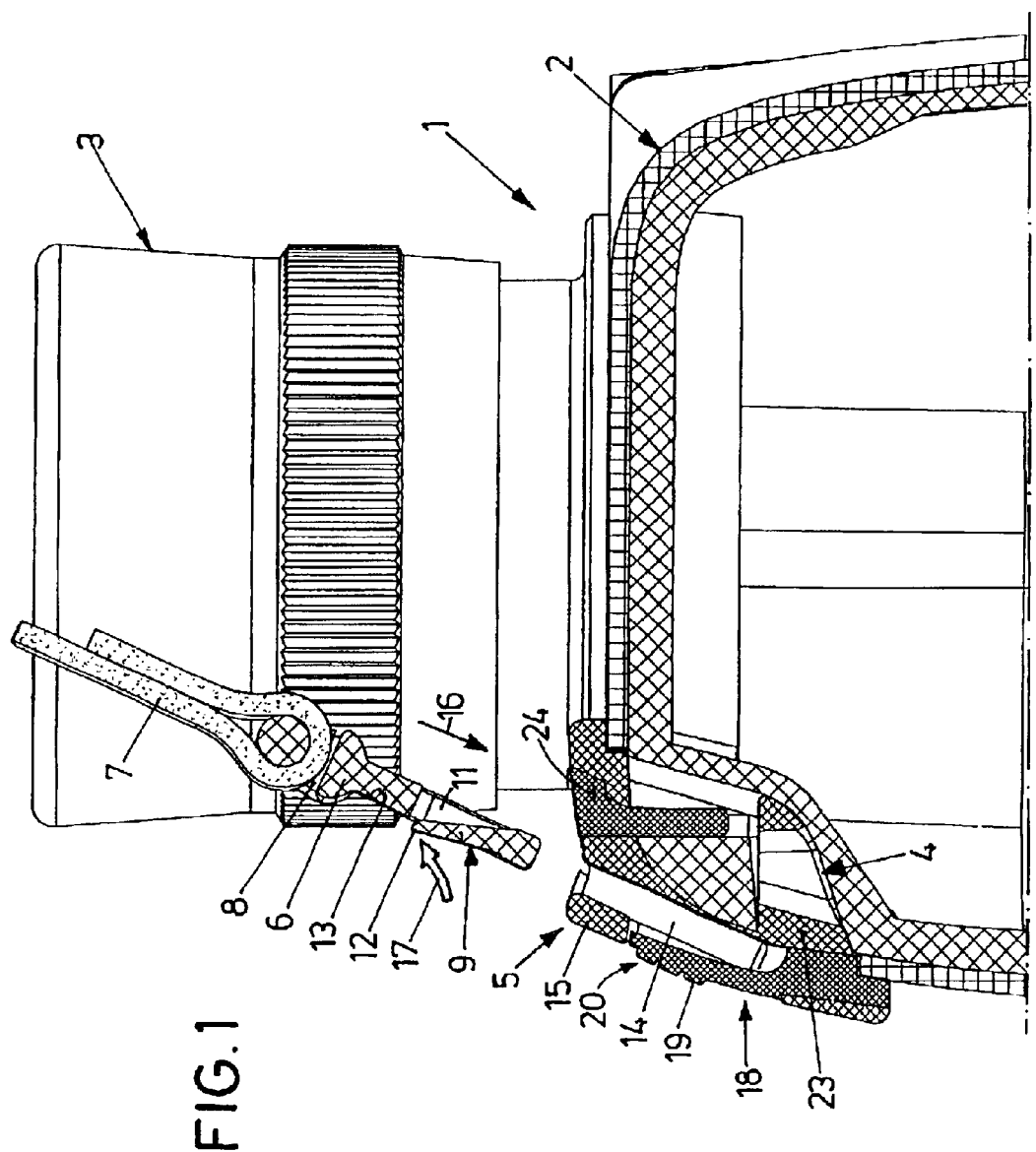

The present invention is directed to binoculars, a telescope, or the like, having a removable strap.

2. Background Art

With binoculars, the strap is of significant importance since, for example at sea or while hunting, the binoculars are, as a rule, carried hanging from the strap and picked up only as required for observation purposes.

In certain situations it is also desirable, however, to remove the strap from the binoculars, even if only to exchange the strap.

Known techniques for connecting straps to binoculars are either complex, expensive, awkward in their operation, or they have an unsatisfactory design.

SUMMARY OF THE INVENTION

Based on this, the invention has as its object to further develop the fastening means of the strap on optical devices in such a way that a reliable and simultaneously easy to manage configuration is achieved along with an appealing design.

This object is met according to the invention in such a way that a coupling is disposed on the binocular casing, and a coupling pin that cooperates with the coupling is disposed at the end of the strap, wherein the coupling pin incorporates an inherently elastic locking tab that projects hook-like from the plane of the coupling pin surface, the coupling has a longitudinal recess to receive the locking tab under elastic deformation of the same, wherein, when the locking tab is inserted into the longitudinal recess, the locking tab locks behind a coupling projection, and wherein the longitudinal recess is open toward the outside and a swivel-mounted release key is disposed there in such a way that, by pushing the release key from outside in, the locking tab is pushed inward and moved out of engagement with the coupling projection.

A coupling arrangement of this type can be integrated into the casing of an optical device, such as, e.g., a pair of binoculars, easily and with an appealing design, it can be implemented inexpensively by means of a plastics production technique, and permits a simple operation that does not require much explanation and is practically self-evident.

In a further development of the invention, provision is made for the release key to be connected integral and inherently elastic to a release mechanism that is supported on the casing, i.e., the implementation takes place with a single extruded plastic element.

From a production point of view, it is equally advantageous to design the locking tab integral with the coupling pin.

The coupling pin may, in a manner known per se, have a deflection means for the strap.

The release key may advantageously have actuation ribs on its outside to ensure a good grip.

To achieve an appealing design, the coupling may be disposed in a recess of the casing and fastened there by means of a holding spur and a locking wedge.

The invention will be described in more detail below based on a preferred embodiment in conjunction with the drawing.

BRIEG DESCRIPTION OF THE DRAWING

Figure 2:
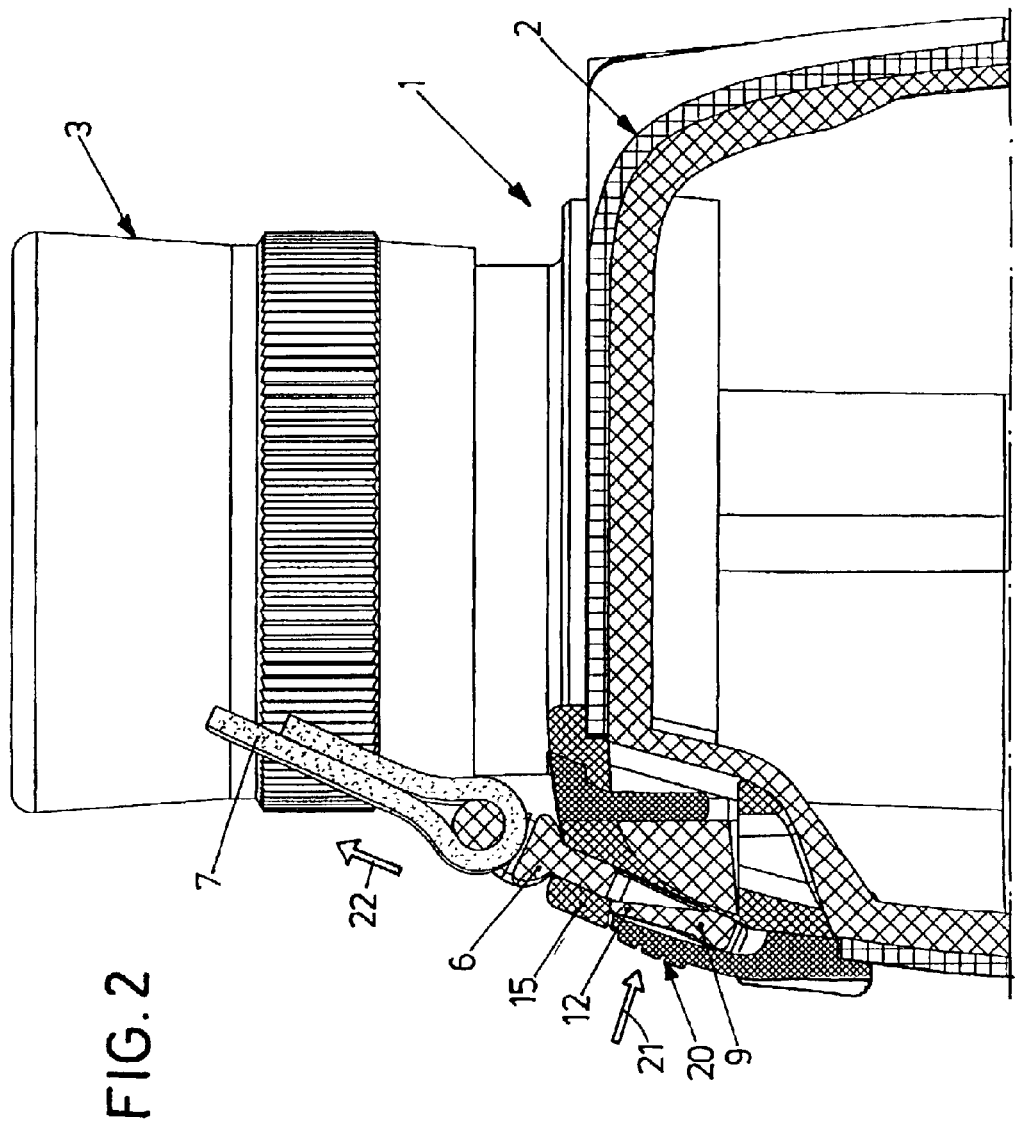
Figure 3:
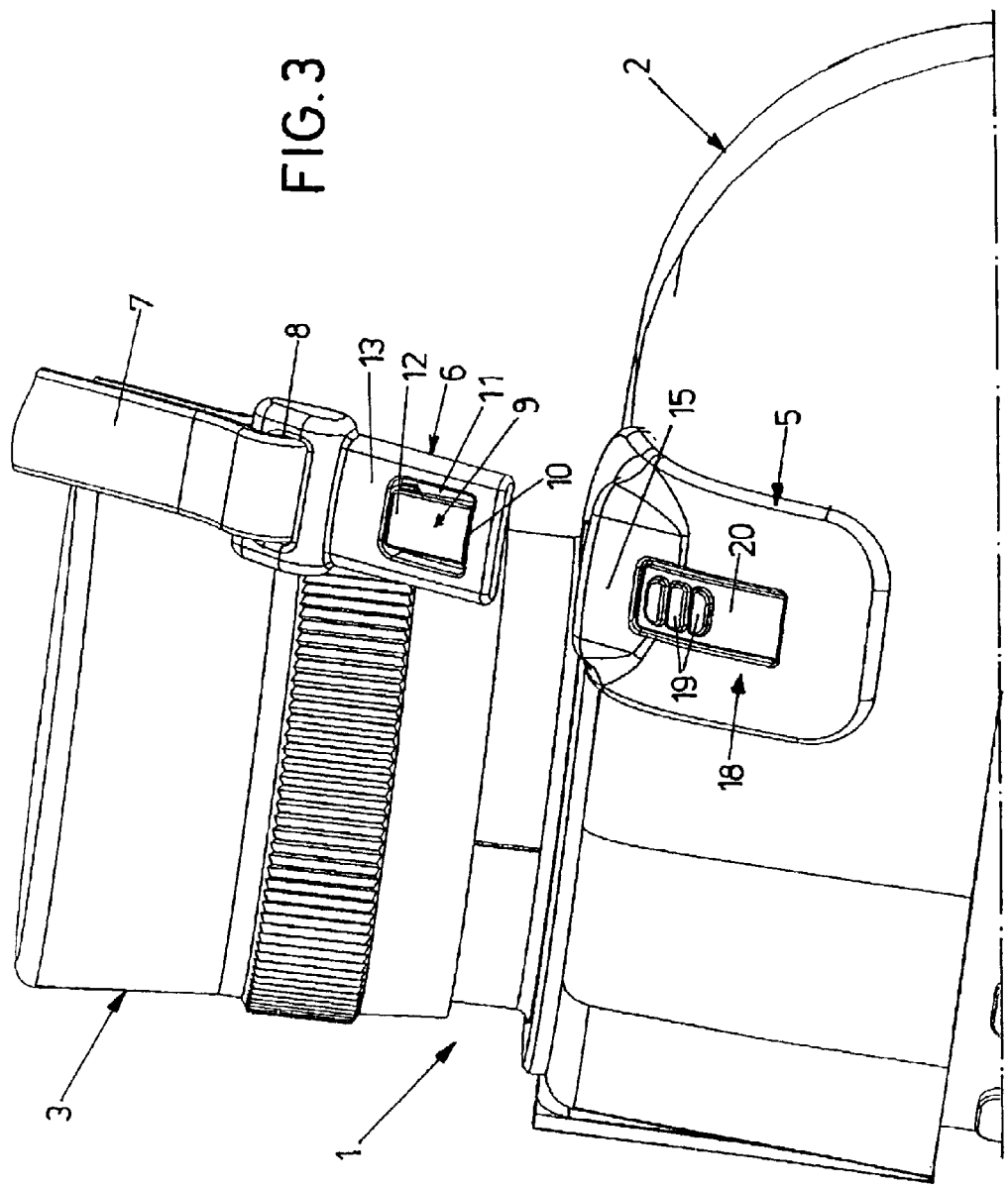

FIG. 1 shows a longitudinal section through the region of the coupling of a pair of binoculars prior to attaching the holding strap, FIG. 2 shows a sectional view corresponding to FIG. 1 after attaching the holding strap, FIG. 3 shows a partial view corresponding to FIG. 1, FIG. 4 shows a partial view corresponding to FIG. 2.

DESCRIPTION OF THE PREFERRED EMBODIMENT

The drawing shows part of a pair of binoculars 1 encompassing a casing 2 and two oculars 3.

The casing 2 has a recess 4 in which a coupling 5 is disposed, to which a coupling pin 6 can be connected, to which a strap 7 is fastened. Fastening of the strap 7 takes place by deflection through a recess 8 at the upper end of the coupling pin 6.

At the lower end of the coupling pin 6, a locking tab 9, which is extruded integral with the coupling pin 6, is disposed, which, at its lower end 10 (see FIG. 3) transitions into the coupling pin 6 and is otherwise separated from the same by a U-shaped recess 11 and, at its upper end 12, projects beyond the plane 13 of the outside of the coupling pin 6, as it is apparent especially in FIGS. 1 and 2.

The coupling 5 incorporates a longitudinal recess 14, which is delimited at its upper side by a coupling projection 15. The longitudinal recess 14 is dimensioned such that when the coupling pin 6 or its locking tab 9 is inserted in the direction of the arrow 16 in FIG. 1, the upper end 12 is elastically pushed inward in the direction of the arrow 17 in FIG. 1, to lock under the coupling projection when the coupled condition shown in FIG. 2 has been attained.

To release the connection attained in this manner, a release mechanism 18 is provided, which incorporates a release key 20 provided on its outside with ribs 19 and formed integral with the release mechanism.

By actuating the release key 20, i.e., by pushing it in, in the direction of the arrow 21 in FIG. 2, the end 12 of the locking tab 9 under the coupling projection is pushed inward, so that, when the strap 7 is pulled in the direction of the arrow 22 in FIG. 2, the upper end 12 of the locking tab 9 and thus the entire locking tab 9 is pulled up past the coupling projection 15, and the strap is released.

The coupling 5 is fixed in the recess 4 of the casing 2 by means of a cast holding spur 23 and locking wedge 24.

What is claimed is:

1. A pair of binoculars or telescope having a removable strap comprising:

a coupling (5) fixed on a casing (2) of the binoculars (1) or telescope, and a coupling pin (6), which cooperates with the coupling (5), disposed at an end of the strap (7), wherein the coupling pin (6) incorporates an inherently elastic locking tab (9) that projects outward from a plane of the coupling pin surface, the coupling (5) having longitudinal recess (14) to receive the locking tab (9) when elastically deformed, wherein, when the locking tab (9) is inserted into the longitudinal recess (14), the locking tab (9) locks behind a coupling projection (15), wherein the longitudinal recess (14) is open toward the outside and a swivel-mounted release key (20) is separately engaged in the longitudinal recess in such a way that by pushing the release key (20) from outside toward the longitudinal recess (14), the locking tab is pushed inward and moved out of engagement with the coupling projection (15), wherein the release key (20) is formed as a unit with a release mechanism (18) which is separately engaged in the longitudinal recess and supported on the casing (2), the release key (20) being inherently elastic and wherein the coupling (5) is disposed in a recess (4) of the casing (2) by means of a holding spur (23) and a locking wedge (24).

2. The pair of binoculars or the telescope according to claim 1, wherein the locking tab (9) is formed integral with the coupling pin (6).

3. The pair of binoculars or the telescope according to claim 1, wherein the coupling pin (6) has a deflection means for the strap (7).

4. The pair of binoculars or the telescope according to claim 1, wherein the release key (20) has actuation ribs (19) on an outside thereof.

* * * * *